United States Patent [19]

Dettmer

[11] Patent Number: 5,245,562
[45] Date of Patent: Sep. 14, 1993

[54] ACCUMULATING ARITHMETIC MEMORY INTEGRATED CIRCUIT

[75] Inventor: Jay R. Dettmer, Columbia, Md.

[73] Assignee: The Johns Hopkins University, Baltimore, Md.

[21] Appl. No.: 761,105

[22] Filed: Sep. 17, 1991

[51] Int. Cl.$^5$ .............................................. G06F 7/38
[52] U.S. Cl. ................................................. 364/736
[58] Field of Search ...................... 364/736, 754, 768

[56] References Cited

U.S. PATENT DOCUMENTS

| | | | |
|---|---|---|---|
| 4,583,184 | 4/1986 | Murase | 364/518 |
| 4,608,634 | 8/1986 | Caudel et al. | 364/200 |
| 4,833,629 | 5/1989 | Moore | 364/555 |
| 4,852,040 | 7/1989 | Oota et al. | 364/736 X |
| 4,891,779 | 1/1990 | Hasebe | 364/754 |
| 4,945,506 | 7/1990 | Baji et al. | 364/736 |
| 5,053,631 | 10/1991 | Perlman et al. | 364/736 X |
| 5,128,888 | 7/1992 | Tamura et al. | 364/736 X |

*Primary Examiner*—Tan V. Mai
*Attorney, Agent, or Firm*—Francis A. Cooch

[57] ABSTRACT

An accumulating arithmetic memory (AAM) integrated circuit or AAM chip that includes a set of accumulators or registers. Once an accumulator is selected, e.g., by using a look up table, a multiplexer retrieves the data from the selected accumulator. Then, as input data is presented to the AAM chip, an adder adds, subtracts or multiplies the input data with the data retrieved from the selected accumulator. The resulting output is returned to the originally selected accumulator. The multiplexer can also substitute a zero for the data retrieved from each accumulator and an internal address counter is used to read out the contents of all accumulators.

13 Claims, 9 Drawing Sheets

ACCUMULATING ARITHMETIC MEMORY INTEGRATED CIRCUIT

STATEMENT OF GOVERNMENTAL INTEREST

The Government has rights in this invention pursuant to Contract No. N00039-89-C-5301 awarded by the Department of the Navy.

BACKGROUND OF THE INVENTION

In most data gathering systems, tremendous quantities of data are collected and then must be reduced to permit study of the phenomena of interest. This data reduction task is typically accomplished in real-time by large amounts of hardware or off-line, slower than real-time, by extensive computer systems.

SUMMARY OF THE INVENTION

The data reduction problem described above is solved to a great extent through the practice of the invention. Specifically, the invention, called the Accumulating Arithmetic Memory (AAM) chip, is an integrated circuit that performs a data reduction process at speeds much faster than can be obtained by firmware-based signal processors and in fewer integrated circuits than can be obtained with standard integrated circuits. Furthermore, the data reduction process is relatively intelligent and can be tailored to the user's application.

As shown functionally in FIG. 1, the AAM chip provides a set of registers or accumulators that are selected by some outside means. As input data is presented to the AAM chip, that data can be added to, subtracted from or multiplied by the contents of the selected accumulator and the result placed back in that same accumulator. Means are also provided to zero each accumulator and to read out the contents of all accumulators. Thus, the invention provides a novel and intelligent means for performing some forms of data reduction.

DETAILED DESCRIPTION

Figure 1:
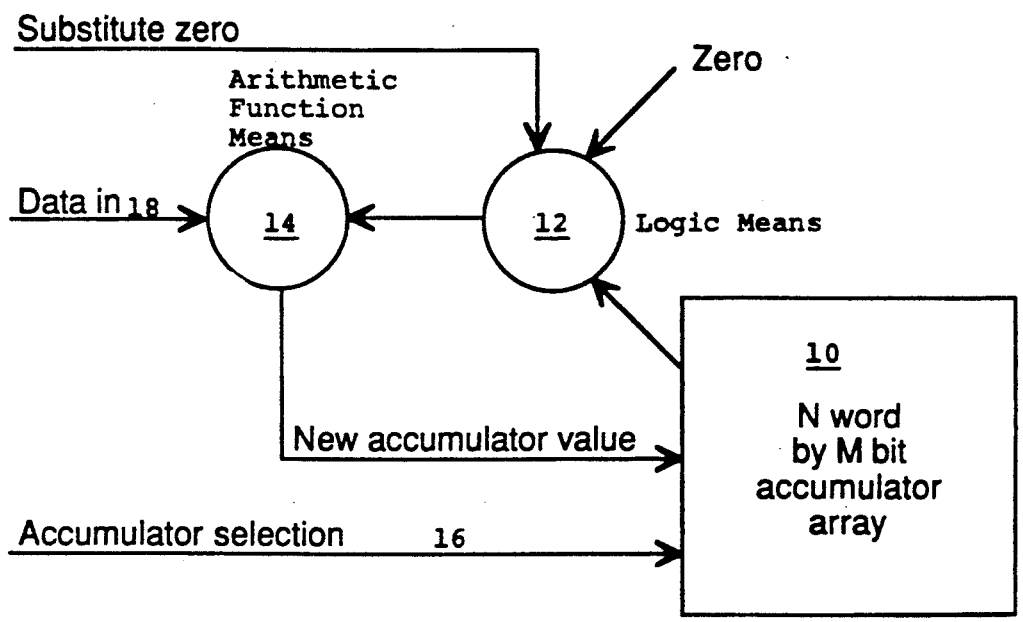
FIG. 1 is a functional diagram of the integrated circuit of the invention.

A functional diagram of the integrated circuit or AAM chip of the invention is shown in FIG. 1. The chip includes: an accumulator or register array 10; a logic means 12 (which could also be a multiplexer) used to retrieve data from an accumulator in the accumulator array 10 or to initialize the accumulator by substituting a zero for the retrieved data; and an arithmetic function means 14 used to operate on incoming or input data by adding, subtracting or multiplying such data either with the data retrieved from the accumulator array 10 by logic means 12 or with a zero substituted for the retrieved data b logic means 12. The resulting data or output from the arithmetic function means 14 is then returned or placed back into the accumulator in the accumulator array 10 from which the data was originally retrieved by logic means 12.

In operation, a register in the accumulator array 10 is selected (via line 16) and the data in the selected register is retrieved by the logic means 12; the retrieved data is either passed through to the arithmetic function means 14 or a zero is substituted for it by the logic means 12 and provided to the arithmetic function means 14. The arithmetic function means 14 operates on the retrieved data or the zero by adding, subtracting or multiplying it with an input data value arriving via line 18. The resulting output is placed back in the same register in the accumulator array 10 from which the data was originally retrieved by the logic means 12.

Figure 2:
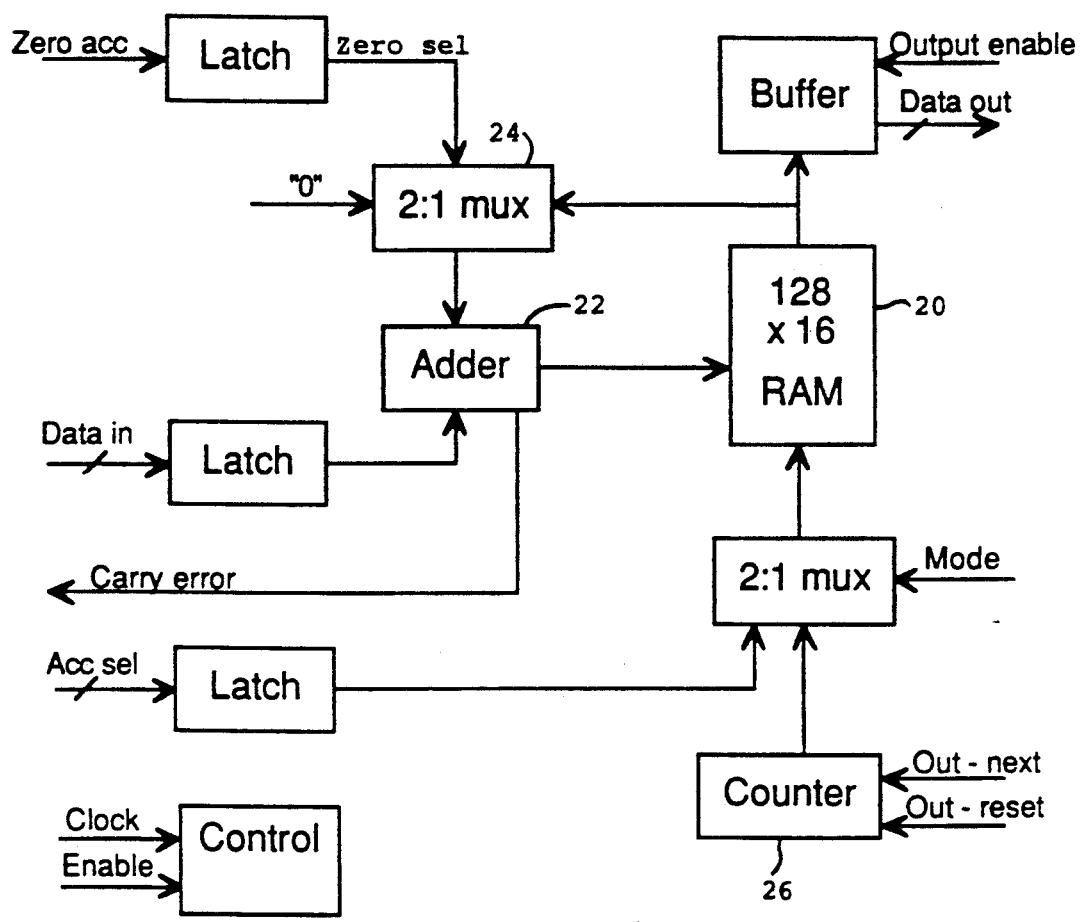
FIG. 2 is an implementation of the integrated circuit of the invention.

FIG. 2 is a more detailed circuit level drawing showing an implementation of the AAM chip. In FIG. 2, the accumulator array consists of a 128×16 random access memory (RAM) 20 with an adder 22 for the arithmetic function means and a 2:1 multiplexer 24 used in place of the logic means to retrieve data from the RAM 20 and, if desired, to substitute a zero for the retrieved data.

Figure 3:
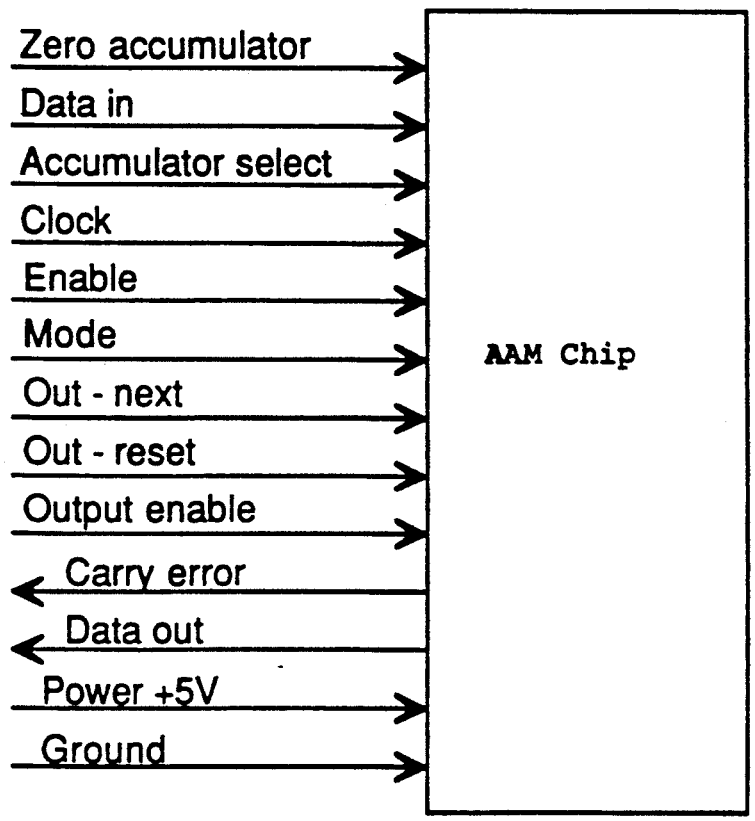
FIG. 3 illustrates the external interfaces of the implementation of the integrated circuit of the invention as shown in FIG. 2.

FIG. 3 shows the external interfaces of the chip implementation of FIG. 2. Table 1 below describes the interfaces' functions.

TABLE 1

| AAM CHIP INTERFACE SIGNALS | |
|---|---|
| Signal name | Function |
| Zero accumulator | If active, substitute zero for old value of the accumulator when read. If inactive, read the old value from the selected accumulator. Signal is sampled on rising edge of "Clock". |
| Data in | Provides data to be added to the selected accumulator. Data is sampled on rising edge of "Clock". |
| Accumulator select | Selects which accumulator is to be read and updated. Selection is sampled on rising edge of "Clock". |
| Clock | A constant clock with 50% duty cycle that is used for internal operations. |
| Enable | If active, perform normal accumulate operation. If inactive, perform no accumulate operation. Signal is sampled on rising edge of "Clock". |
| Mode | If active, operate in the accumulate mode. If inactive, operate in the read out mode. Signal is sampled on rising edge of "Clock". |
| Out-next | After rising edge of signal, increment the output counter on the next rising edge of "Clock". Signal is then inactive until it returns to low state. Signal may be asynchronous to "Clock". |
| Out-reset | After rising edge of signal, reset the ouput counter to zero on the next rising edge of "Clock". Signal is then inactive until it return to low state. Signal may be asynchronous to "Clock". |
| Output enable | If active, "Data out" actively drives the bus. If inactive, "Data out" lines are held in tri-state mode. Signal may be asynchronous to "Clock". |

TABLE 1-continued
AAM CHIP INTERFACE SIGNALS

| Signal name | Function |
|---|---|
| Carry error | If active, indicates that the accumulation function during the previous clock period resulted in an overflow. If inactive, indicates that no overflow was detected during the previous clock cycle. Signal becomes active on rising edge of "Clock". |
| Data out | If "Output enable" signal is active, the value of the currently selected accumulator is output on these lines. If "Output enable" signal is inactive, lines are held in tri-state mode. If in Readout mode, the "Data out" lines are true ½ clock period after the readout address has been changed. Data outlines will stay valid until the readout address is changed again. If in Accumulate mode, the "Data out" lines reflect the old value of the selected accumulator during the first ½ of the clock period (after a slight delay) and the "Data out" lines reflect the new value of the selected accumulator during the second ½ of the clock period (after a slight delay). Due to the delays, the use of the "Data out" lines in the Accumulate mode are not recommended. |
| Power +5 V | Power for chip operation at 5.0 volts, ±0.25 volts. |
| Ground | Return line for chip power at 0 volts. |

In the implementation of the AAM chip shown in FIGS. 2 and 3, an accumulation operation is started when the "Mode" line is active (Accumulate mode), the "Enable" line is active (enabled), and the "Clock" signal transitions from low to high state. On the rising edge of "Clock", all input signals are latched for stability. A read cycle is then performed during the first half of the "Clock" signal (phase 1), using the "Accumulator select" lines as the address. The data read from the accumulator RAM is added to the "Data in" value and the result is written back into the accumulator RAM during the second half of the "Clock" signal (phase 2). Note that the same address is used for both the read and the write addresses. If the addition results in an overflow condition (i.e., the result is greater than the maximum number that can be represented with the number of data bits), then the "Carry error" signal is activated during the next clock period.

A special case of the accumulation operation is the zero operation. It operates in a manner identical to that described above except that, if the "Zero accumulator" signal is active, then the value read from the accumulator RAM is replaced with zero. This has the effect of zeroing the old value of the accumulator. If "Data in" is also zero, a zero will be stored in the selected accumulator. If "Data in" is not zero, then the value of "Data in" will be stored in the selected accumulator, since in this implementation the only arithmetic operation is addition.

The read out operation uses an internal address counter 26 (FIG. 2) to reduce the pin count of the AAM chip while also providing a very simple method of accessing the accumulated data. (Alternate read out methods are equally valid and may be better for some specific applications.) The read out mode is selected by forcing the "Mode" line inactive. Typically, the first action would be to force the "Out-reset" line active. This will set the counter to zero. Within one "Clock" period, the accumulated value from address zero can be output on the "Data out" lines while the "Output enable" line is active. By cycling the "Out-next" line through its low and high states, the address counter can be incremented and the next accumulator read. This process can be repeated until all accumulators have been read.

Figure 4:
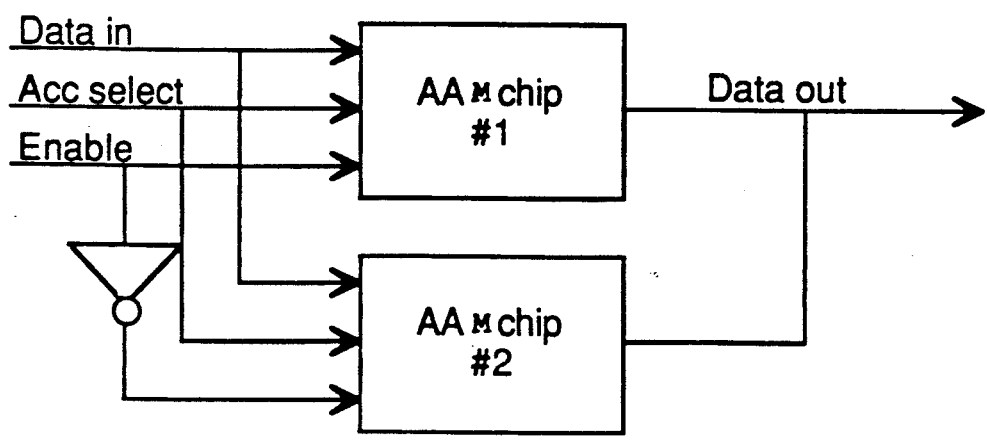
FIG. 4 illustrates an implementation employing more than one integrated circuit of the invention.

An additional feature of the AAM chip is the ease with which it can be expanded. As shown in FIG. 4, if more accumulators are needed, additional AAM chips can be placed in parallel operation.

The intelligence and broad applicability of the AAM chip operation resides, in part, in how the accumulators are selected. Three primary accumulator selection mechanisms exist: using some portion of the raw data, using a look up table to transform the data in some way, or using an independent variable. In addition, three variations of the input/incoming data to be added to the accumulators are also possible: the raw data itself, a constant such as 1, or an independent variable. Table 2 lists these combinations.

TABLE 2
SOME POSSIBLE AAM CHIP FUNCTIONS

| Case | Accumulator select | Data to add | Resulting function |
|---|---|---|---|
| 1 | Upper bits of data | Constant = 1 | Histogram of data values |
| 2 | Upper bits of data | Data itself | Power histogram |
| 3 | Upper bits of data | Independent data | Data correlation |
| 4 | Look up table by data | Constant = 1 | Histogram |
| 5 | Look up table by data | Data itself | Data compression |
| 6 | Look up table by data | Independent data | Data correlation |
| 7 | Independent data | Constant = 1 | Histogram of events |
| 8 | Independent data | Data itself | Data compression |
| 9 | Independent data | Independent data | Redundant with case 6 |

Figure 5:
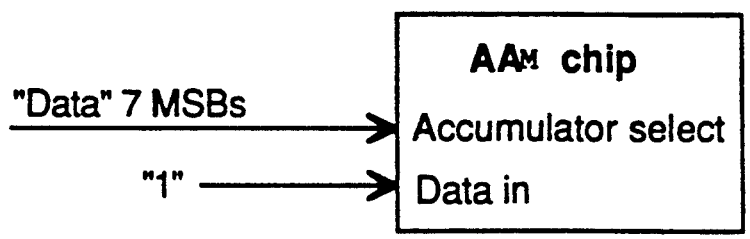
FIG. 5 illustrates functionally a histogram application of the invention.
Figure 5:
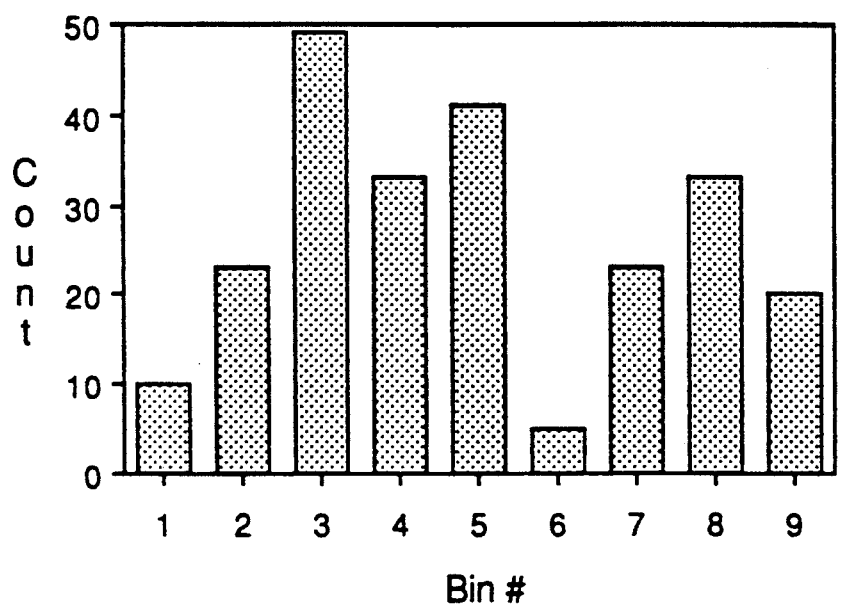

Case #1 uses a portion of the input data as the accumulator select address. Each data point selects an accumulator and adds the value 1 to the selected accumulator. The resulting function (FIG. 5) performs a histogram on the data—noting how many values within each bin range have been received.

Figure 6:
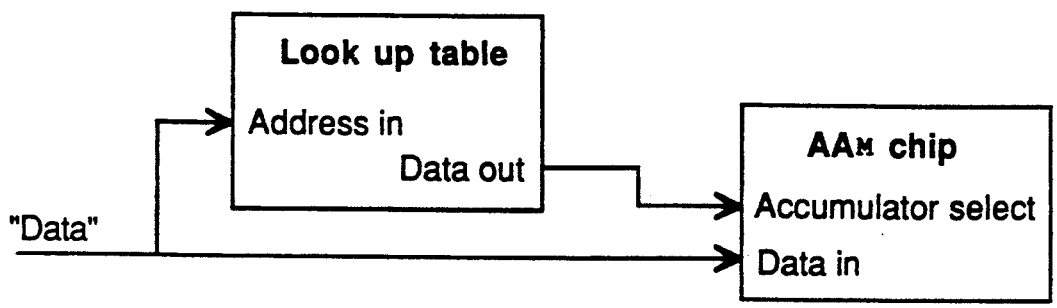
FIG. 6 illustrates functionally a look up table application of the invention.
Figure 6:
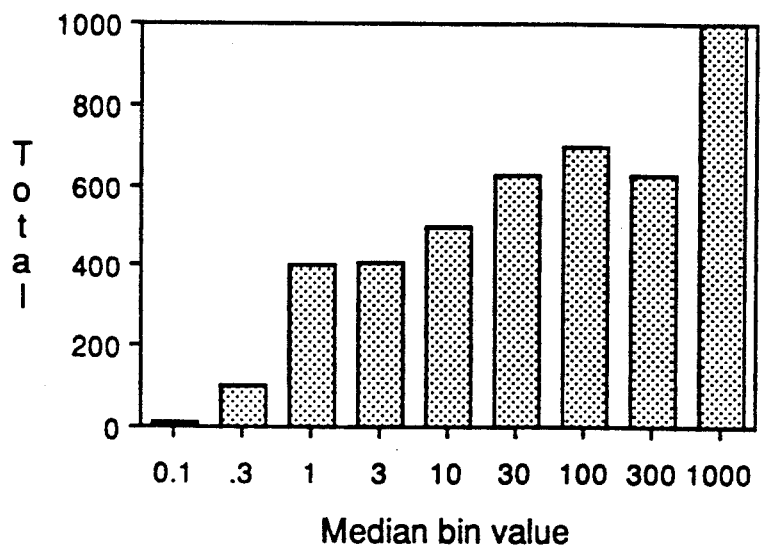

Case #5 uses a look up table indexed by the input data to select the accumulator. Then the input data is added to the specified accumulator. The resulting function (FIG. 6) is dependent upon the function of the look up table. For example, if the look up table performs a logarithm function, then the overall function will be the accumulation of the data by logarithmic bins.

Figure 7:
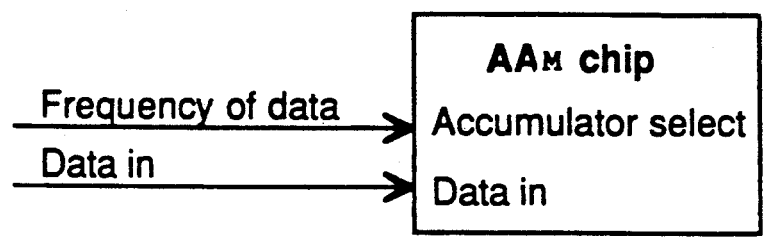
FIG. 7 illustrates functionally a frequency binning application of the invention.
Figure 7:
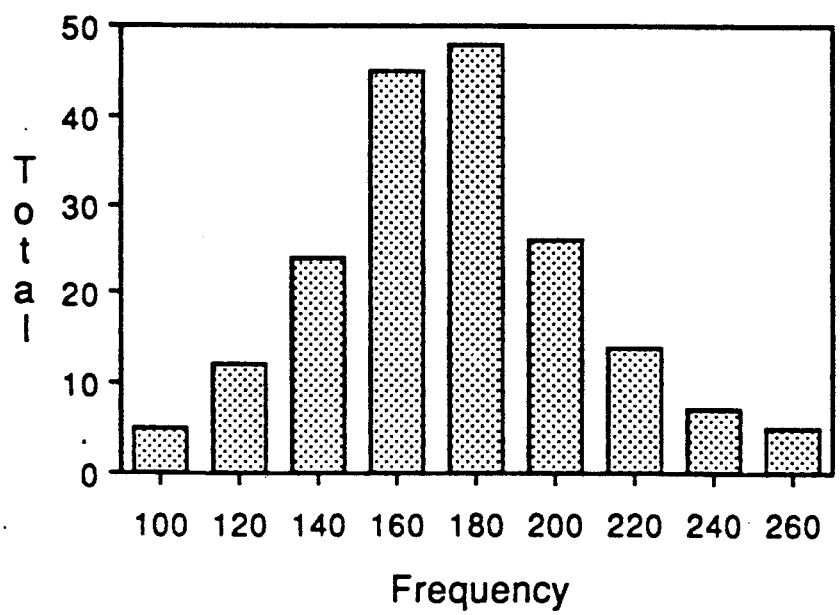

Case #8 uses independent data to select the accumulator that the input data will be added to. This case is the most interesting since it has many practical applications. One such application is to an adaptive optics processor mirror mapping to mirror actuator problem described in greater detail below. Another application uses the frequency of the data as the independent variable (FIG. 7). This results in the accumulation of data by frequency bins, a very common signal processing step.

The above are examples and are not intended to limit the application of the chip of the invention.

As noted above, one application of the AAM chip is as part of an adaptive optics processor to "detwinkle" stars. As light passes through the earth's atmosphere, the co-phasal light from point source stars is refracted by "bubbles" in the atmosphere. The point source image is thus translated in the X-Y plane and its light becomes phase distorted. These disturbances occur at low frequencies up to a few hundred Hertz. This phenomenon is perceived by the naked eye as a star's "twinkle".

Figure 8:
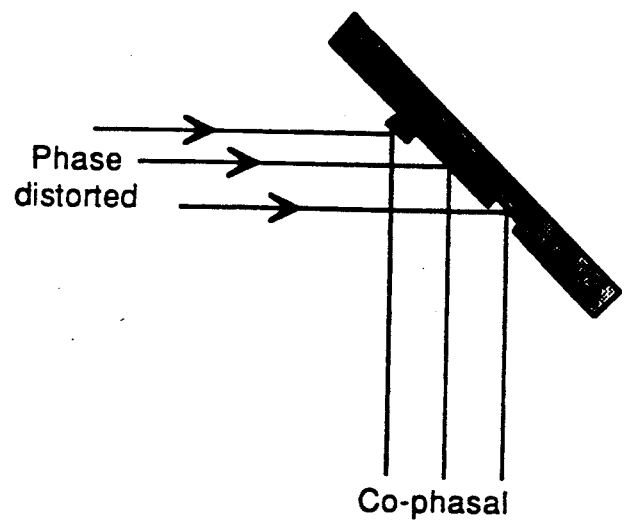
FIG. 8 illustrates the use of a flexible mirror to restore phase distortions.

Adaptive optics seeks to correct these atmospheric disturbances by distorting the mirrored surface of a membrane such that the phase disturbances are canceled (FIG. 8). However, even with simplified computational requirements, any mirror sensor system requires significant processing in a one millisecond period due to the large number of adaptive mirror segments (about 91 segments for a 1 meter telescope and between 700 to 800 segments for an 8 meter telescope).

Figure 9:
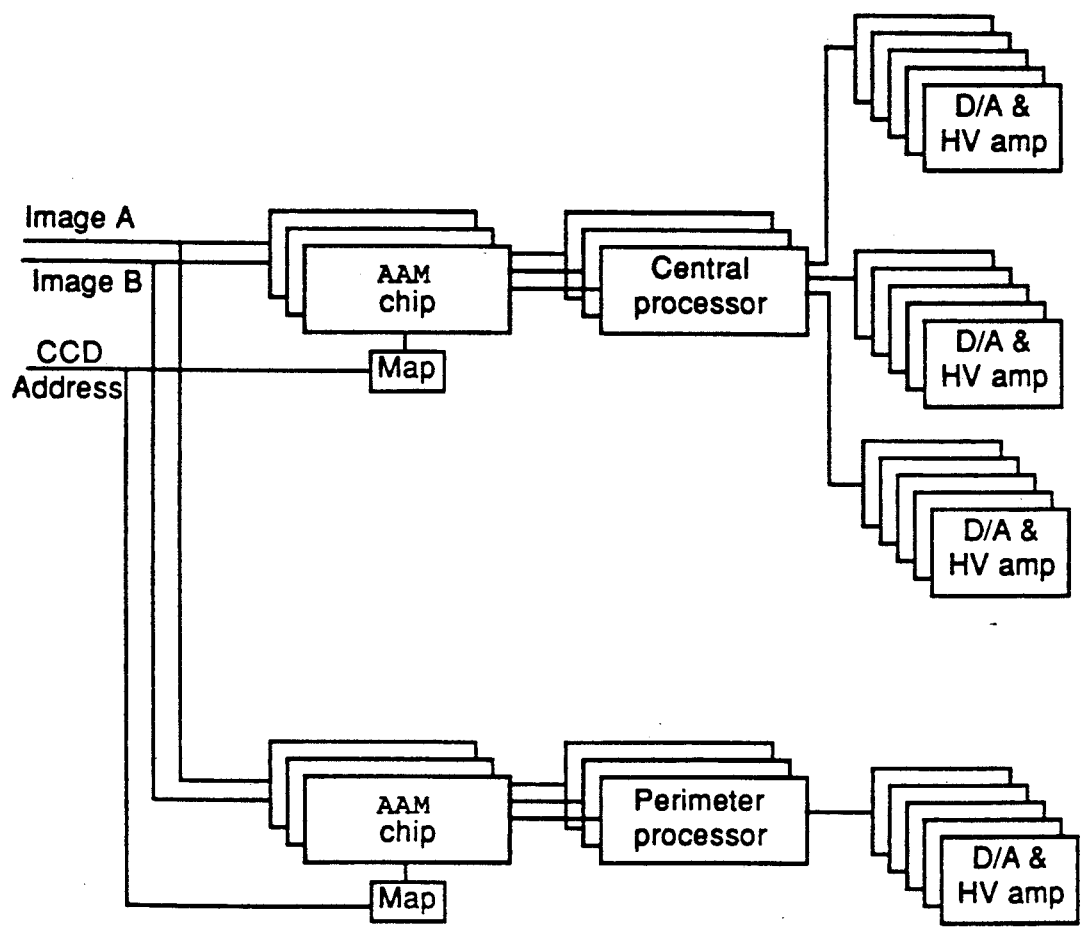
FIG. 9 is a diagram of an adaptive optics control processor which contains the integrated circuit of the invention.

The adaptive optics control processor (AOCP) has been developed to process the large amounts of data necessary for any adaptive optics mirror sensor system. As shown in FIG. 9, the AOCP consists of three types of parallel processors performing subsets of the overall problem.

Figure 10:
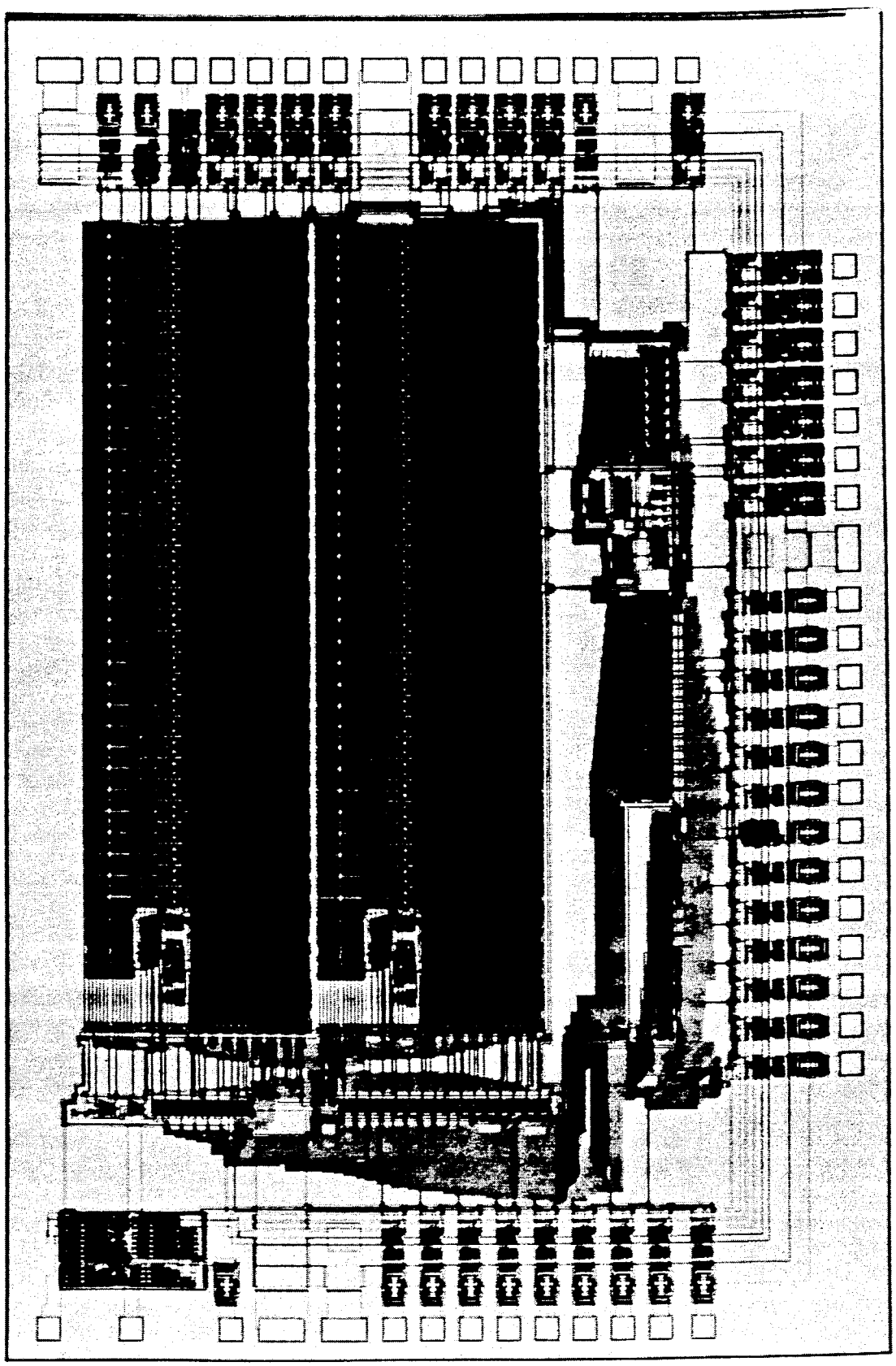
FIG. 10 is a photograph of an implementation of the integrated circuit of the invention for use in the adaptive optics control processor shown in FIG. 9.

The first type of processor is the AAM chip of the invention which in this application is really a data preprocessor which maps the imager's pixel matrix into the mirror actuator matrix as the data is read out of the imager. A high speed, arbitrary mapping system is used that enables the system to compensate for translation misalignments, rotational misalignments, and "bad" pixels. This arbitrary mapping of pixels is contained in a user programmable look up table. FIG. 10 is a photograph of the actual AAM chip developed for the AOCP application.

The second and third processors are commercially available digital signal processors programmed to process the central mirror actuators and the perimeter mirror actuators and the overall image tilt.

The AOCP's architecture is flexible and extensible to accommodate larger imaging devices, more mirror actuators, different shaped mirror actuators, more stringent timing requirements, imager misalignments, and bad imager pixels. These attributes are motivated by practical alignment and imager constraints, and the desire to experiment with different flexible mirror layouts. Thus, with adaptive optics and recently developed large mirror technology, ground based telescopes can approach or exceed the resolution of space borne telescopes such as the Hubble Space Telescope at lower cost.

Although originally designed for use in adaptive optics, the AAM chip has broad applications, as previously suggested. The chip design can generate a histogram where data values select the accumulator register, making tee chip applicable for imaging systems and automatic gain control. A look up table can be used to address a particular accumulator register based on the input data characteristics. Further, the AAM chip can be used for frequency binning if the register select was based on the frequency of data. The AAM chip architecture is also uniquely designed for parallel configurations.

The invention may also be implemented in other significant ways, for example:

1. As already suggested, the AAM chip can provide an add/subtract function instead of only the add function. An additional select line would be used to designate if the input data is to be added or subtracted from the accumulator. Some scientific applications could make use of this feature. In fact, the adaptive optics application described above could use this feature if the relative gain of the imager pixels are similar enough.

2. The read out address generation method described above (using an internal counter) benefits the microprocessor used in the described application. However, the read out address can be selected via the accumulator select lines instead. This would provide random access to the accumulators instead of the sequential access provided by the counter.

3. Paralleling of the AAM chip to achieve wider word widths can be obtained by increasing the "Data in" lines to a full 16 bits and by adding a carry in and a carry out line. Thus, two chips could provide 32 bits of accumulation. The ripple carry function between chips would tend to decrease the operational speed of the AAM chip.

4. Additional enable lines can be added to provide easier on chip address decoding. However, this function can easily be done off chip if the design becomes I/O pin limited.

I claim:

1. An accumulating, arithmetic memory integrated circuit comprising:
   a plurality of accumulators, each of the plurality of accumulators containing data;
   means for selecting one of the plurality of accumulators;
   a logic means for retrieving the data from the selected accumulator; and
   an arithmetic function means for operating on the data retrieved by the logic means by adding, subtracting or multiplying the retrieved data with input data and for placing the data resulting from the operation of the arithmetic function means back into the accumulator from which the data was retrieved by said logic means;
   wherein the integrated circuit is wired into a second circuit to perform a specific data reduction function without using other processing assistance.

2. The integrated circuit as recited in claim 1, wherein the logic means is a multiplexer.

3. The integrated circuit as recited in claim 1, wherein the logic means substitutes a zero for the retrieved data.

4. The integrated circuit as recited in claim 1, further comprising means for addressing the plurality of accumulators to read out the data resulting from the operation of the arithmetic function means.

5. The integrated circuit as recited in claim 4, wherein the addressing means comprises an internal address counter for sequentially accessing the plurality of accumulators.

6. The integrated circuit as recited in claim 4, wherein the addressing means comprises the selecting means for randomly accessing the plurality of accumulators.

7. The integrated circuit as recited in claim 1, wherein the arithmetic function means uses a constant to operate on the data retrieved from one of the plurality of accumulators.

8. The integrated circuit as recited in claim 1, wherein the arithmetic function means uses an independent variable to operate on the data retrieved from one of the plurality of accumulators.

9. The integrated circuit as recited in claim 1, 7 or 8, wherein the selecting means selects an accumulator using independent data.

10. The integrated circuit as recited in claim 1, 7 or 8, wherein the selecting means selects an accumulator using a look up table.

11. The integrated circuit as recited in claim 1, 7 or 8, wherein the selecting means selects an accumulator using a portion of the input data.

12. The integrated circuit as recited in claim 1, further comprising means for address decoding.

13. The integrated circuit as recited in claim 1, further comprising means for increasing the capability of the integrated circuit to accept wider word widths.

* * * * *